[11] 3,601,465

[72] Inventor William James Hannan
Pennington, N.J.
[21] Appl. No. 5,237
[22] Filed Jan. 23, 1970
[45] Patented Aug. 24, 1971
[73] Assignee RCA Corporation

[54] HOLOGRAPHIC STORAGE AND RETRIEVAL OF INFORMATION
4 Claims, 5 Drawing Figs.

[52] U.S. Cl. .................................................. 350/3.5
[51] Int. Cl. .................................................. G02b 27/22
[50] Field of Search .................................... 350/3.5

[56] References Cited
UNITED STATES PATENTS
3,516,721 6/1970 Collier et al. ................. 350/3.5
3,547,511 12/1970 King ............................. 350/3.5

OTHER REFERENCES
McCrickerd et al. Applied Physics Letters, Vol. 12 No. 1 (1/1968)
DeBitetto, Applied Physics Letters, Vol. 12, No. 10 (5/1968)

*Primary Examiner* — David Schonberg
*Assistant Examiner* — Robert L. Sherman
*Attorney* — H. Christoffersen ABSTRACT: A single picture is stored as a plurality of holograms, each on a succeeding frame of a storage tape. Each hologram is a recording of the information present in a different small area of the picture. During readout, the tape may be driven continuously relative to the readout beam and the reconstructed image thereupon made to appear as a scanned picture. The reconstruction may be made to occur on a stationary storage medium having storage properties such as a film or a scannable electronic storage means.

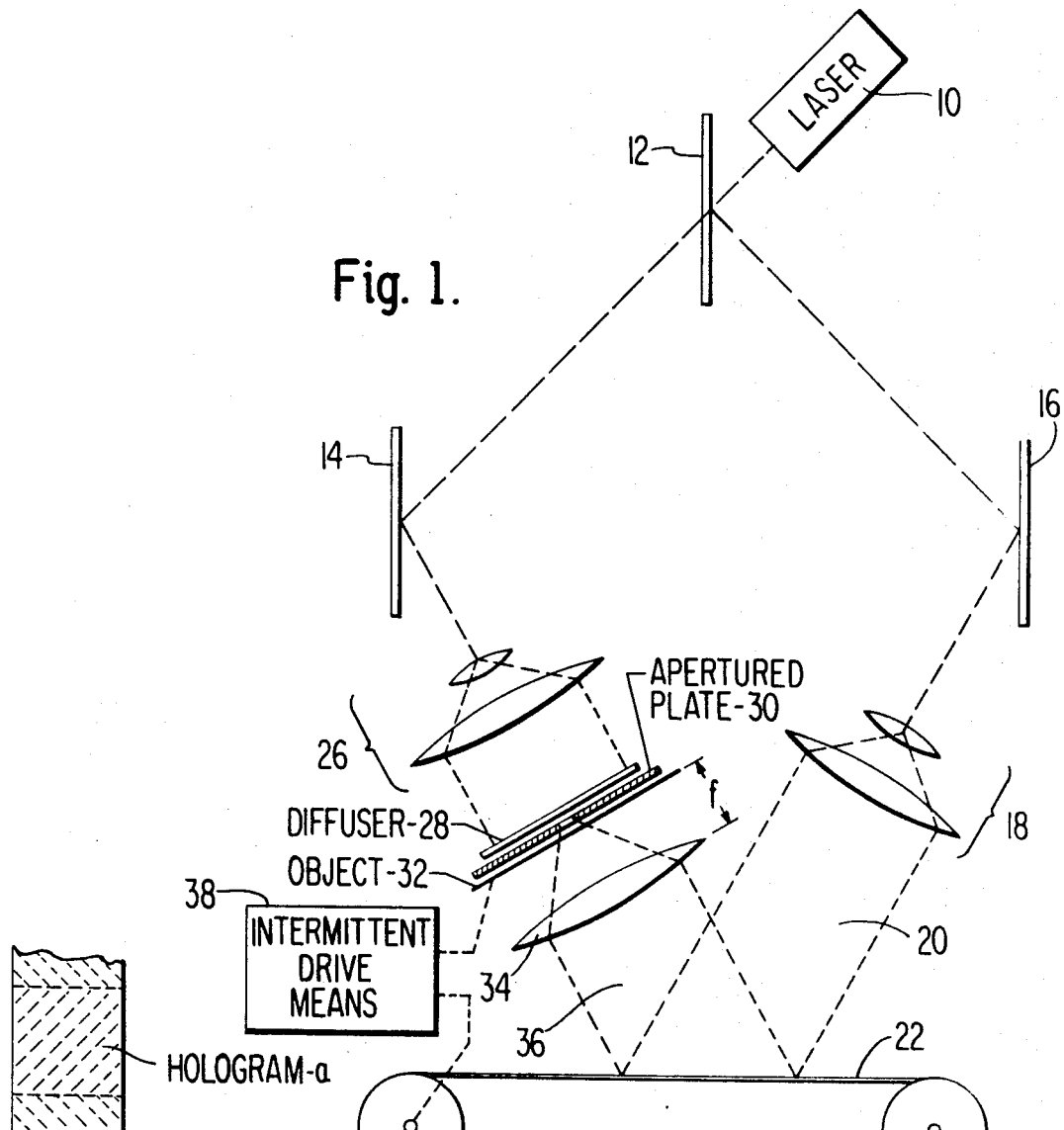

PATENTED AUG24 1971 3,601,465

INVENTOR.
William J. Hannan
BY
Samuel Cohen
ATTORNEY

HOLOGRAPHIC STORAGE AND RETRIEVAL OF INFORMATION

BACKGROUND OF THE INVENTION

There are many applications where it is necessary to store information in a form that insures reliable retrieval. The more conventional, currently used storage methods are susceptible to loss or distortion of information due to damage to, or other degradation of, the storage medium. For example, stored pictures may become scratched, bleached, dirty, torn, and so on.

A certain amount of immunity to degradation and damage such as described above may be achieved by storing information in the form of holograms. Such holograms, when made from diffusely reflecting or diffusely illuminated objects, have a high degree of redundancy. In effect, the diffuse nature of the recording process causes information from every point on an object to be spread over the entire hologram. Conversely, every point on the hologram contains information about the entire object. It follows, therefore, that "diffuse" holograms can be scratched, spotted with dirt or even broken into pieces and yet, a complete image can be reconstructed. All of this is already well known.

It should be apparent from the above that the larger the hologram, the more redundant information present and the more certain it is that the recorded information accurately and reliably can be retrieved. But, very large holograms are difficult to record, store and play back.

The object of the present invention is to provide a new and improved storage technique which permits highly reliable retrieval of the stored data.

SUMMARY OF THE INVENTION

According to the invention, holograms of successive small areas of a picture to be recorded are formed on successive areas of a hologram recording medium. Each such hologram may be made by illuminating a small area of the picture with coherent light and receiving at an area of the recording medium, while the medium is stopped, light both from the illuminated small area and from the source of coherent light employed to illuminate the picture. The picture may be retrieved by creating continuous relative motion between the recording medium and a readout coherent light beam and receiving at a stationary image receiving means having storage properties, the reconstructed images thereby produced of the successive small areas of the picture.

BRIEF DESCRIPTION OF THE DRAWING

FIG. 1 is a schematic showing of apparatus for recording holograms according to the invention;

FIGS. 2 and 3 are more detailed views of portions of the apparatus of FIG. 1;

DETAILED DESCRIPTION

Figure 3:
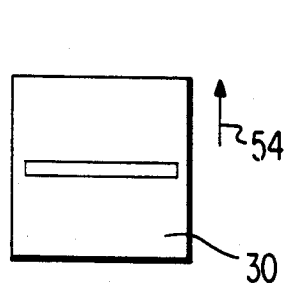

Typical hologram efficiency is of the order of 3 percent. This means that about 3 percent of the readout beam gets diffracted into the image. Therefore, the signal-to-noise ratio of a reconstructed image is strongly dependent on the nature of the image. A point image is reconstructed from its hologram with the highest signal-to-noise ratio since all the light diffracted by the hologram is focused into a single spot.

In the process of making a hologram such as described above, light from the single point object, because of diffraction, spreads over the entire hologram. It follows that even if a relatively large portion of this hologram becomes scratched or otherwise damaged, the remaining portion of the hologram still contains sufficient information about this relatively small area to provide reasonable fidelity in the reconstruction process.

Conversely to the above, a relatively large image is reconstructed from its hologram with the lowest signal-to-noise ratio since the light diffracted by the hologram is spread over a relatively large area. Holograms of this type clearly are not as damage resistant as holograms of a point image.

In the holographic recording and retrieval system of the present application, use is made of the principles above. The information to be recorded, which may be any kind of a picture or other object, for example the picture of a scene or the picture of light and transparent areas representing stored binary information, or a graph, chart or the like, is recorded as a series of holograms on a recording medium such as a tape. Each hologram is of only a small portion of the picture. The result is that the picture is recorded as a relatively large number of holograms which together simulate one very large hologram. By reducing the size of the area corresponding to each hologram, almost any desired amount of redundancy and therefore reliability may be achieved.

Referring now to FIG. 1, a coherent light source, such as laser 10, applies an intense beam of light through half-silvered mirror 12 to reflector 14 and reflects light from the surface of half-silvered mirror 12 to reflector 16. The light from reflector 16 is broadened by suitable optics, shown schematically as a pair of lenses 18, and the broadened light beam 20, known as the "reference" beam, passes to the recording medium 22. The latter is in the form of a tape which extends between a takeup reel 22 and a storage reel 24. The tape may be any form of material suitable for recording the hologram such as a photographic film, a tape coated with photoresist, a tape formed of manganese-bismuth magnetic material and so on.

The laser beam reflected from reflector 14 is broadened by optics 26 and applied to a diffuser plate 28. The diffused light passes through an apertured plate 30 and the object 32. The latter may be the picture it is desired to store in a highly reliable and faithfully reproducible fashion.

The diffused light passes through the picture and is diffracted by the picture to the lens 34. The spacing between the lens and the picture is substantially equal to the focal distance of the lens so that the beam of light produced by the lens consists of essentially parallel rays. This beam 36 is known as the "object" beam.

Figure 5:
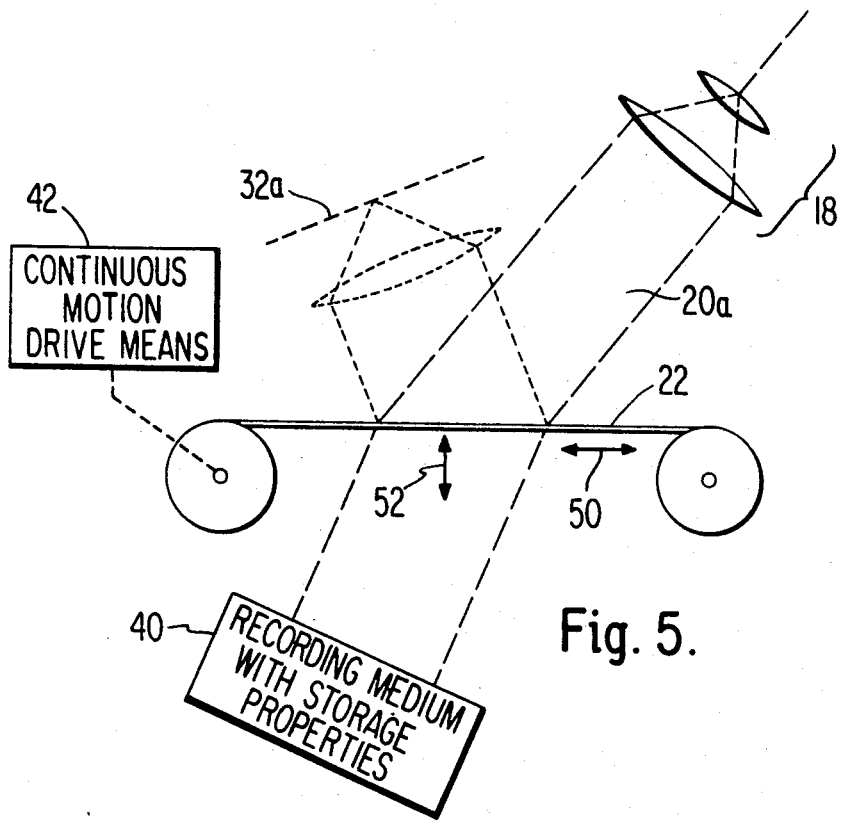
FIG. 5 is a schematic showing of apparatus according to the invention for retrieving the stored information.

As is well understood in this art, the object and reference beams create a light interference pattern at the recording medium 22 which is recorded there in the form of a hologram. With the placement of the object at the focal plane of the lens, the hologram is one known in the art as a Fraunhofer type hologram. The location of the image which can be reconstructed from this type of hologram, as will be discussed shortly in connection with FIG. 5, is independent of hologram translation; that is, is independent of movement of the hologram either in the direction in which the tape is driven or movement in a direction perpendicular thereto.

The system of FIG. 1 also includes an intermittent drive means 38, connected to drive the tape and to concurrently drive either the object or the apertured plate. For purposes of the present discussion, the drive means 38 is shown connected to the object, however, the invention also works with the object stationary and the apertured plate driven.

In the operation of the system of FIG. 1, to start with, the intermittent drive means 38 maintains both the object and the recording medium 22 stationary. The apertured plate 30, which may take the form shown in FIG. 3, is aligned with one region of the object. For example, the slot may be aligned with the region $a$ of the object 32, as shown in FIG. 2. Now, the laser may be "turned on" for the required exposure time and a hologram of the area $a$ formed on the tape. The region (frame) of the tape containing the hologram $a$ is shown in FIG. 2. (While in the present explanation it is indicated that the laser is turned on and off it is to be understood that, if desired, the laser may be on continuously and a shutter employed to achieve the same effect.)

An alternate way to achieve essentially the same result is to focus the object beam to a point on the object and move either the object or the point of light prior to each exposure. The advantage of this method is higher efficiency in the use of the light from laser 10.

After hologram a is formed, the intermittent drive means 38 is actuated and it moves the recording medium 22 to the next frame and then stops the recording medium. The drive means 38 also moves the object until the next region—region b, is aligned with the slot in the plate 30. Now the laser 10 is turned on again for the appropriate exposure interval and the next hologram b is formed on the tape. This process continues until the entire object has been recorded as a series of successive holograms along the length of the tape 22. Thereafter, the film is processed—developed and fixed, to obtain permanent storage of the holograms.

The method of retrieving the stored information is shown in FIG. 5. The optics 18 are in the same position relative to the recording medium 22 as in FIG. 1 so that the readout beam 20a, which may be derived from the same or a similar laser source such as shown in FIG. 1, strikes the recording medium 22 at the same angle as did the reference beam 20.

The reconstructed image is received by a recording medium 40. It may be any type of light receiving means having storage properties. For example, it may simply be a photographic film. As an alternative, if the information reconstructed is desired only to be viewed and no permanent record is needed, an electronic pickup device may be employed. As one example, the means 40 may be a television camera having storage properties which may be scanned to produce electrical signals. These electrical signals may be applied to a conventional television display means such as a kinescope. Other alternatives are possible. For example, if the object is moved during recording, prior to each exposure, with the exposure aperture held stationary then the information will be played back as an intensity modulated spot of light. In this case detection can be achieved with a conventional photodiode and the information can then be recorded by a conventional flying spot scanning method. The surface of the recording medium 40 optimally is at a position conjugate to that of the object, which object is shown in phantom view at 32a in FIG. 5. (Alternatively, the recording means may be at position 32a to receive the reflected reconstructed image, however the arrangement shown is preferred as it is relatively insensitive to tape twist.)

In the operation of the system of FIG. 5, the recording medium may be driven in continuous fashion by the continuous motion drive means 42 during the illumination of the recording medium by the readout beam 20a. The result is that of producing a scanned picture on the surface of the stationary recording medium 40. The continuous movement of the recording medium produces the effect of what might be termed a holographic flying spot scanner. As the holograms for the single object extend over a relatively large area, the stored information is extremely scratch resistant and is also resistant to other forms of damage. In view of the extreme amount of redundancy, it is possible, very reliably and very faithfully, to reconstruct the information which is stored.

Another important advantage of the system of the present invention is that the position of the recording medium 22 during retrieval is not very critical. The continuous movement of the recording medium in the direction of arrows 50 does not cause any blurring or movement in the reconstructed image nor does any reasonable amount of movement of the tape in the direction of the arrows 52. This is a property of Fraunhofer holograms.

While the invention has been described in terms of the use of a tape for storing the holograms, it is to be appreciated that other forms of the invention are possible. For example, the recording medium may be a disc which is intermittently driven during the write operation and which is continuously driven during readout. Moreover, while in the embodiment of the invention illustrated, the readout beam 20a is stationary and the recording medium is moved, it is possible to operate the invention by maintaining the recording medium stationary and moving the readout beam. During such movement, of course, the angle between the readout beam and the recording medium should remain substantially the same as the angle between the reference beam 20 and the recording medium during the write operation.

Figure 4:
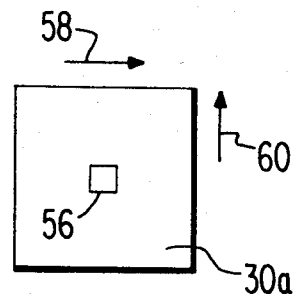
FIG. 4 shows a modified form of the apertured plate of FIG. 3.

While for the sake of simplicity, the invention has been described in terms of a plate 30 formed with a slot therein which requires relative movement between the object 32 and the plate 30 in only one direction, as illustrated by arrow 54 in FIG. 3, other forms of the invention are possible. For example, the plate may be formed with a smaller aperture 56, as shown in FIG. 4. In this form of the invention, the relative motion between the plate 30 and the object 32 occurs in two different directions, as illustrated by the arrows 58 and 60, analogously to the horizontal and vertical scans of television. The advantage of employing a smaller aperture 56 is that the picture is subdivided into smaller areas, resulting in a greater number of holograms and a corresponding greater amount of redundancy in the recorded information. A disadvantage, however, is that more space is needed on the recording medium 22 and a more complex intermittent drive means 38 is needed for producing the horizontal and vertical scanning motions.

What I claim is:

1. A method of storing and retrieving a still picture comprising the steps of;

forming separate Fraunhofer holograms of successive small areas of the picture on successive areas of a hologram recording medium, each hologram being made by illuminating only a small area of the picture with coherent light, and receiving at an area of the recording medium, while the medium is stopped, light both from the illuminated small area and from the source of coherent light employed to illuminate the picture;

retrieving the entire picture by creating continuous relative motion between the recording medium and a readout coherent light beam and receiving at a stationary image receiving means having storage properties the reconstructed images thereby produced of the successive small areas of the picture.

2. The method of claim 1 wherein the separate holograms are formed on successive frames of a recording tape.

3. The method of claim 1 wherein the relative motion between the recording medium and coherent light beam is created by continuously driving the recording medium.

4. A system for storing and retrieving a still picture comprising, in combination:

a recording medium;

means for directing one portion of a laser beam onto a small area of said picture;

means for directing the light coming from said small area and light from another portion of said laser beam onto one region of said recording medium to record a Fraunhofer hologram of said small area at said one region of said recording medium;

means for moving the recording medium to successive new positions and each time said medium is stopped at a new position recording, at another region of said medium, a Fraunhofer hologram of another small area of said picture, until holograms have been made of all areas of said picture; and means for reading out the recorded holograms comprising means for continuously driving said recording medium while applying a coherent readout beam thereto for reconstructing successive images of the successive small areas of the picture, and means for receiving and storing the successive images to form from the separate successive images one complete picture.

75